United States Patent [19]

Matsushima

[11] Patent Number: 5,333,027
[45] Date of Patent: Jul. 26, 1994

[54] CAMERA HAVING AUTOMATIC EXPOSURE BRACKETING DEVICE

[75] Inventor: Hiroshi Matsushima, Tokyo, Japan

[73] Assignee: Canon Kabushiki Kaisha, Tokyo, Japan

[21] Appl. No.: 4,646

[22] Filed: Jan. 19, 1993

Related U.S. Application Data

[63] Continuation of Ser. No. 707,834, May 30, 1991, abandoned.

[51] Int. Cl.$^5$ .................... G03B 7/00; G03B 13/36
[52] U.S. Cl. ..................... 354/400; 354/412
[58] Field of Search .............. 354/402–409, 354/412, 441–445, 400

[56] References Cited

U.S. PATENT DOCUMENTS

| | | | |
|---|---|---|---|
| 3,762,285 | 10/1973 | Tenkumo | 354/458 |
| 4,734,727 | 3/1988 | Takemae | 354/412 |
| 4,931,823 | 6/1990 | Nakajima et al. | 354/412 |
| 4,933,770 | 1/1990 | Ikeda et al. | 354/402 |
| 4,974,011 | 11/1990 | Azuma et al. | 354/412 |
| 4,984,005 | 1/1991 | Kazami et al. | 354/412 |
| 5,099,267 | 3/1992 | Satou et al. | 354/412 |

Primary Examiner—W. B. Perkey
Attorney, Agent, or Firm—Robin, Blecker, Daley & Driscoll

[57] ABSTRACT

This invention provides a camera having an automatic exposure bracketing device for performing photography while sequentially altering an exposure value for exposure of each frame. According to the invention, the camera is capable of selectively operating in a mode for performing continuous photography for a plurality of frames under photographic conditions by a single depression of a release button and a mode for repeatedly performing photography while the release button is being depressed.

18 Claims, 7 Drawing Sheets

FIG.3

|  | PROGRAM | APERTURE PRIORITY | SHUTTER SPEED PRIORITY |
|---|---|---|---|
| -1 | f6.7  1/180 | f5.6  1/250 | f8  1/125 |
| CORRECT | f5.6  1/125 | f5.6  1/125 | f5.6  1/125 |
| +1 | f4.5  1/90 | f5.6  1/60 | f4  1/125 |

FIG.4

|  | PROGRAM | APERTURE PRIORITY | SHUTTER SPEED PRIORITY |
|---|---|---|---|
| CORRECT | f5.6  1/125 | f5.6  1/125 | f5.6  1/125 |
| -1 | f6.7  1/180 | f5.6  1/250 | f8  1/125 |
| -2 | f8  1/250 | f5.6  1/500 | f11  1/125 |
| -3 | f9.5  1/350 | f5.6  1/1000 | f16  1/125 |

FIG.5

| | SW2 | SINGLE SHOOTING | CONTINUOUS SHOOTING |
|---|---|---|---|
| 1 | ON | CORRECT | CORRECT |
| 2 | OFF | -1 | NO RELEASE |
| 3 | OFF | -2 | NO RELEASE |
| 4 | OFF | -3 | NO RELEASE |
| 5 | OFF | NO RELEASE | NO RELEASE |
| 6 | ON | CORRECT | -1 |
| 7 | ON | -1 | -2 |
| 8 | ON | -2 | -3 |
| 9 | OFF | -3 | NO RELEASE |
| 10 | OFF | NO RELEASE | NO RELEASE |
| 11 | OFF | NO RELEASE | NO RELEASE |
| 12 | ON | CORRECT | CORRECT |
| 13 | OFF | -1 | NO RELEASE |
| 14 | ON | -2 | -1 |
| 15 | ON | -3 | -2 |
| 16 | OFF | NO RELEASE | NO RELEASE |
| . | . | . | . |

CAMERA HAVING AUTOMATIC EXPOSURE BRACKETING DEVICE

This is a continuation application under 37 CFR 1.62 of prior application Ser. No. 707,834, filed May 30, 1991, abandoned.

BACKGROUND OF THE INVENTION

1. Field of the Invention

The present invention relates to a camera which is arranged to be capable of AEB photography (automatic exposure bracketing photography).

2. Description of the Related Art

Recent cameras are electronically controlled to a high degree and some of them are arranged to automatically execute by easy button operation photographic techniques which have conventionally been used by a professional photographer.

One of the photographic techniques is embodied as an AEB photography function.

The AEB photography function is the function of continuously and automatically performing exposure operations, for example, at a correct exposure value, an overexposure value and an underexposure value in that order on the respective frames of film.

Known AEB photography devices are classified into the following two types, and the two types of AEB photography devices have individually been incorporated into different kinds of cameras.

The first type of AEB photography device operates to perform continuous photography only for a set number of frames by a single operation of a release button when AEB photography is selected. The second type of AEB photography device operates to continuously and repeatedly perform AEB photography by operating a shutter only while the release button is being depressed.

Conventionally, both the first type of AEB photography device and the second type of AEB photography device are not incorporated into the same camera.

The aforesaid known camera having the AEB photography function has the following problem.

In general, when a still subject such as a landscape is to be photographed by AEB photography, it is convenient to continuously expose a set number of frames by the AEB photography by a single operation of a release button. In contrast, if a moving subject is to be photographed by the AEB photography, it is convenient to release a shutter only while the release button is being depressed, whereby photography in favor of shutter opportunity can also be achieved. During the photography of the moving subject, if the AEB photography for the set number of frames is continuously performed by a single operation of the release button, even when the photographer is to take a desired shutter opportunity for releasing the shutter, he cannot release the shutter and will lose the shutter opportunity.

SUMMARY OF THE INVENTION

It is, therefore, an object of the present invention to provide a camera which permits AEB photography of a subject, whether a still subject or a moving subject, to be performed by an easy operation and which can effect optimum-exposure photography of a moving subject without losing a shutter opportunity even during the AEB photography of the moving subject.

It is another object of the present invention to provide a camera which is provided with a first mode for performing continuous AEB processing for a set plurality of frees by a single operation of a release button and a second mode for repeatedly performing AEB processing for respective frees while the release button is being depressed or for performing AEB processing for respective frames each time the release button is depressed, the camera being arranged to select either one of the first and second modes.

To achieve the above objects, in accordance with one aspect of the present invention, there is provided a camera which automatically selects, as an AEB mode, the first mode when its photographic condition is set to a condition suitable for photography of a still subject or the second mode when the photographic condition is set to a condition suitable for photography of a moving subject.

To achieve the above objects, in accordance with another aspect of the present invention, there is provided a camera which automatically selects, as an AEB mode, the first mode when the mode of the camera is set to a single shooting mode suitable for photography of a still subject (a mode for performing photography each time a release button is depressed) or the second mode when the mode of the camera is set to a continuous shooting mode suitable for photography of a moving subject (a mode for performing continuous photography for a number of frames while the release button is being depressed).

To achieve the above objects, in accordance with another aspect of the present invention, there is provided a camera which automatically selects, as an AEB mode, the first mode when the AF mode of the camera is set to a one-shot mode suitable for photography of a still subject (a mode in which focusing is inhibited once in-focus is achieved) or the-second mode when the AF mode of the camera is set to a servo mode suitable for photography of a moving subject (a mode in which, whether or not in-focus is achieved, focusing is continued until photography is performed).

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 3 and 4 are tables showing photographic conditions for AEB photography;

FIG. 5 is a table showing the relation between a switch SW2 and AEB photography in the camera according to the present invention;

DETAILED DESCRIPTION OF THE PREFERRED EMBODIMENTS

Preferred embodiments of the present invention will be described below with reference to the accompanying drawings.

Figure 2:
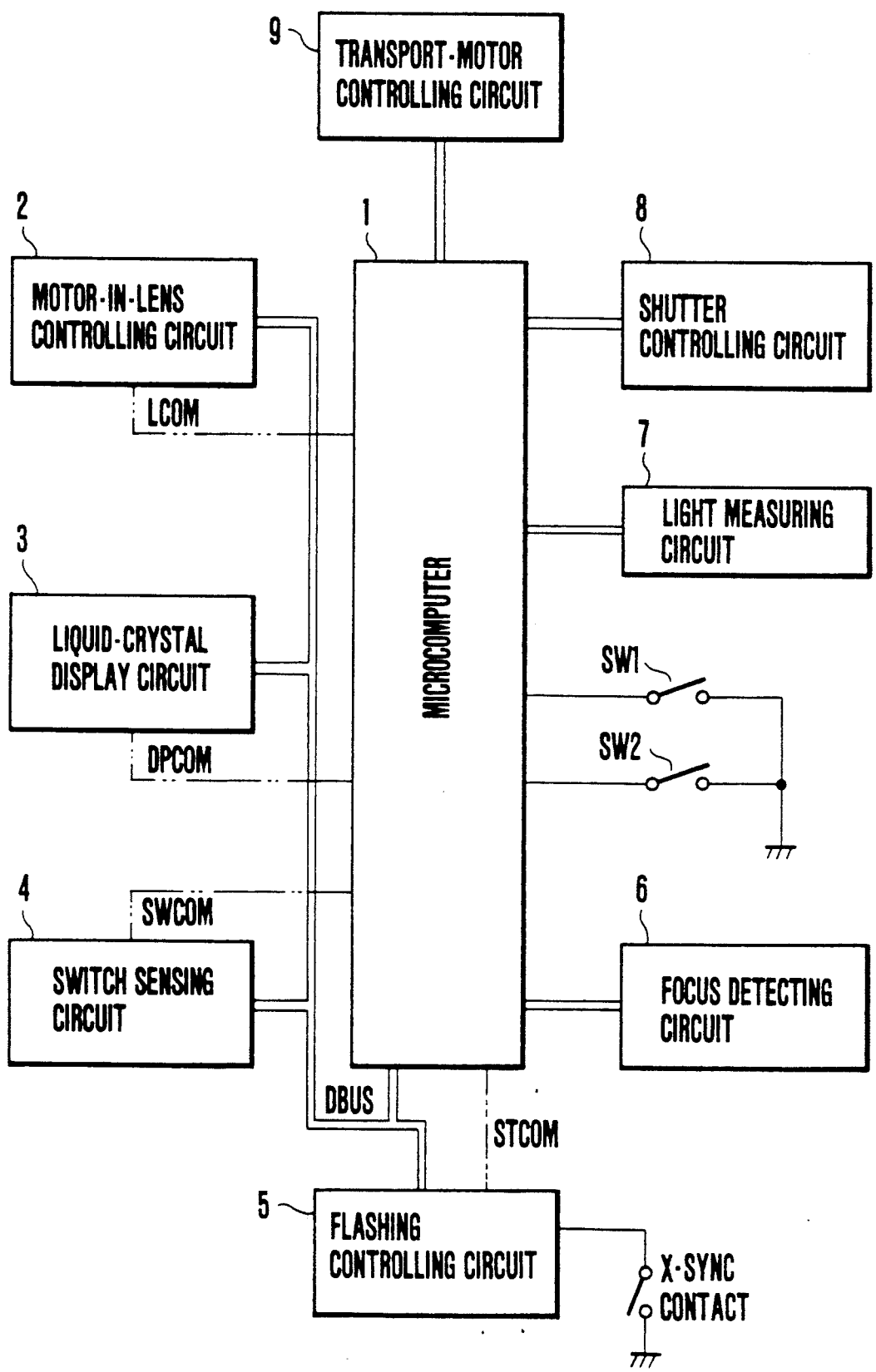
FIG. 2 is a flowchart showing the electrical construction of the camera according to the present invention.

FIG. 2 is a block diagram schematically showing the electrical arrangement of a camera according to the present invention.

The electrical arrangement shown in FIG. 2 includes a microcomputer 1 for providing control over the entire operation of the camera, a motor-in-lens controlling circuit 2 for controlling optical system driving motors (a lens driving motor and a diaphragm blade driving motor) incorporated in a lens barrel, a liquid-crystal display circuit 3 for driving the liquid crystal of a liquid-crystal display device of the camera, a switch sensing circuit 4 for sensing the states of individual detecting switches, a flashing controlling circuit 5 for controlling a flash unit, a focus detecting circuit 6 for detecting the focus of a photographic lens, a light measuring circuit 7 including a light measuring element, a shutter controlling circuit 8 for providing drive control over a shutter, a transport-motor controlling circuit 9 for controlling a motor for film transport, a switch SW1 for initiating the operation of the camera (the switch SW1 is turned on when a release button is operated to reach a first stroke position), a switch SW2 which is turned on when the release button is operated to reach a second stroke position, and an X-sync contact serving as a switch which is turned on when the running of a leading curtain of the shutter is completed.

The double solid line drawn between the microcomputer 1 and each of the circuits represents a serial data bus DBUS, which is arranged between the input/output port of the microcomputer 1 and each corresponding one of the aforesaid circuits. Data communication is performed over the data bus DBUS between the microcomputer 1 and each of the circuits. The two-dot chain lines drawn between the microcomputer 1 and part of the aforesaid circuits represent control signals which are used for the microcomputer 1 to control the corresponding circuits.

While receiving a signal LCOM from the microcomputer 1, the motor-in-lens controlling circuit 2 performs serial communication with the microcomputer 1 over the data bus DBUS. The motor-in-lens controlling circuit 2 receives information as to motor driving by the serial communication and drives and controls each of the motors incorporated in the lens barrel on the basis of the information. Simultaneously, the motor-in-lens controlling circuit 2 sends various kinds of information (a focal length, etc.) about the lens to the microcomputer 1 by the serial communication.

The liquid-crystal display circuit 3 is a circuit for driving a liquid-crystal display unit (not shown) which informs a photographer of various photographic information about the camera, such as a shutter speed, an aperture value, an ISO speed and the number of film exposures. While receiving a signal DPCOM from the microcomputer 1, the liquid-crystal display circuit 3 performs serial communication with the microcomputer 1 over the data bus DBUS. The liquid-crystal display circuit 3 receives display data by the serial communication and drives the liquid-crystal display unit in accordance with the received data.

The switch sensing circuit, 4 serves as a circuit which reads the state of a switch which is operated by the photographer to set each individual photographic condition and which reads the state of a switch for indicating the state of the camera, and sends the read states to the microcomputer 1. While receiving a signal SWCOM from the microcomputer 1, the switch sensing circuit 4 sends the switch data to the microcomputer 1 over the data bus DBUS by the serial communication.

The flashing controlling circuit 5 serves as a circuit which controls flashing of the flash unit and a flashing stop function utilizing TTL light control. While receiving a signal STCOM from the microcomputer 1, the flashing controlling circuit 5 performs serial communication with the microcomputer 1 over the data bus DBUS to receive data from flashing control, thereby providing various kinds of control over the flash unit.

The focus detecting circuit 6 consists of a unit including a line sensor used for performing autofocus utilizing a phase-difference detecting method and a circuit for reading the signal stored in the line sensor. The focus detecting circuit 6 is controlled by the microcomputer 1.

The light measuring circuit 7 performs light measurement of a subject, and sends the light-measurement output to the microcomputer 1 under the control thereof. The microcomputer 1 converts the received light-measurement output from analog form to digital form and employs the digitized light-measurement data as exposure conditions (an aperture and a shutter speed).

The shutter controlling circuit 8 controls running of both the leading curtain and a trailing curtain of the shutter (not shown) in accordance with a control signal sent from the microcomputer 1.

The transport-motor controlling circuit 9 performs transport (winding or rewinding) of a film in accordance with a control signal sent from the microcomputer 1.

When the switch SW1 is turned on and the microcomputer 1 determines that the switch SW1 has been turned on, the microcomputer 1 starts a light measurement operation, a distance measurement operation and a display operation.

When the switch SW2 is turned on and the microcomputer 1 determines that the switch SW2 has been turned on, the microcomputer 1 starts an exposure operation.

The X-sync contact is turned on at the timing of the completion of the running of the shutter leading curtain, thereby serving to inform the flashing controlling circuit 5 of the timing of flashing.

The operation of the camera according to the present invention will be described below with reference to the flowchart of FIG. 1 and FIGS. 3 to 5 in which one embodiment of a control flow is shown.

Step 101: whether the switch SW1 is on or off is determined with an electric power source connected to the microcomputer 1. If the switch SW1 is off, the electric power source is turned off, while if the switch SW1 is on, the process proceeds to Step 102, where the light measurement operation and the distance measurement operation are performed.

Step 102: the light measurement operation and the distance measurement operation are performed.

Step 103: after the light measurement operation and the distance measurement operation, it is determined whether switch SW2 is off or on. If the switch SW2 is off, the process proceeds to Step 104, where it is determined whether the switch SW1 is on or off. If the switch SW2 is on, the process proceeds to a release sequence which starts with Step 105.

Step 104: if it is determined that the switch SW2 is off in the on/off decision which has been made as to the switch SW2 in Step 103, it is then determined whether the switch SW1 is off or on. If the switch SW1 is off, the electric power source is turned off, while if the switch SW1 is on, the process returns to Step 102 for the purposes of the light measurement operation and the distance measurement operation.

Step 105: an aperture value and a shutter speed, each of which takes into account a compensation amount which is set for AEB photography, are set with respect to the correct value (the aperture value and/or the shutter speed required for correct exposure) which has been obtained through the light measurement operation and associated computations in Step 102. FIG. 3 shows Example 1 in which the range of AEB compensation is set to ±1 steps so as to expose three frames at different exposure values centered about a correct exposure value. FIG. 4 shows Example 2 in which the AEB compensation is set in 1-step negative increments within only an underexposure range so as to expose four frames at different exposure values including a correct exposure value. In the case of Example 1 shown in FIG. 3, exposure operations are continued in the order: "−1", "correct", "+1", "−1", "correct", "+1", "−1", . . . until cancellation of the AEB photography. In the case of Example 2 shown in FIG. 4, exposure operations are continued in the order: "correct", "−1", "−2", "−3", "correct", "−1", "−2", "−3", "correct", . . . until cancellation of the AEB photography. The term "correct" represents an exposure value based on the light measurement value obtained by the last light measurement.

Step 106: exposure is performed on the basis of the aperture value and the shutter speed determined in Step 105.

Step 107: it is determined whether a transport mode is set to either a single shooting mode (a mode in which once the release button is depressed to perform a shutter release operation, the next shutter release operation is not permitted until the pressing of the release button is stopped) or a continuous shooting mode (a mode in which a shutter release operation is repeated as long as the release button is depressed, and is not stopped until the pressing of the release button is stopped). If the continuous shooting mode is selected, the process returns to Step 101. If the single shooting mode is selected, the process proceeds to Step 108 so that when the shutter release button is once operated, AEB exposure operations can be continuously performed for a set number of frames for AEB. The mode selection is set by the operation of a switch (not shown) and is set in the microcomputer 1 via the switch sensing circuit 4.

Step 108: the number of frees for AEB is decreased. The number of frees for AEB herein referred to may be selected from numbers, such as "3" if a correctly exposed frame, an overexposed frame and underexposed frame are to be obtained one for each frame, "5" if one correctly exposed frame and two overexposed frames and two underexposed frames are to be obtained, "7" if one correctly exposed frame and three overexposed frames and three underexposed frames are to be obtained, and so on. The number of frees for AEB may be selected from other numbers, such as "2" if one correctly exposed frame and one overexposed or underexposed frame are to be obtained, "3" if one correctly exposed frame and two overexposed or underexposed frames are to be obtained, "4" if one correctly exposed frame and three overexposed or underexposed frames are to be obtained, and so on.

Step 109: it is determined whether the number of frames for AEB is "0". If it is "0", the release sequence is completed and the flow is brought to an end. If it is not "0", the AEB processing of Step 105 followed by the exposure of Step 106 is performed, and the AEB photography is continued.

Figure 1:
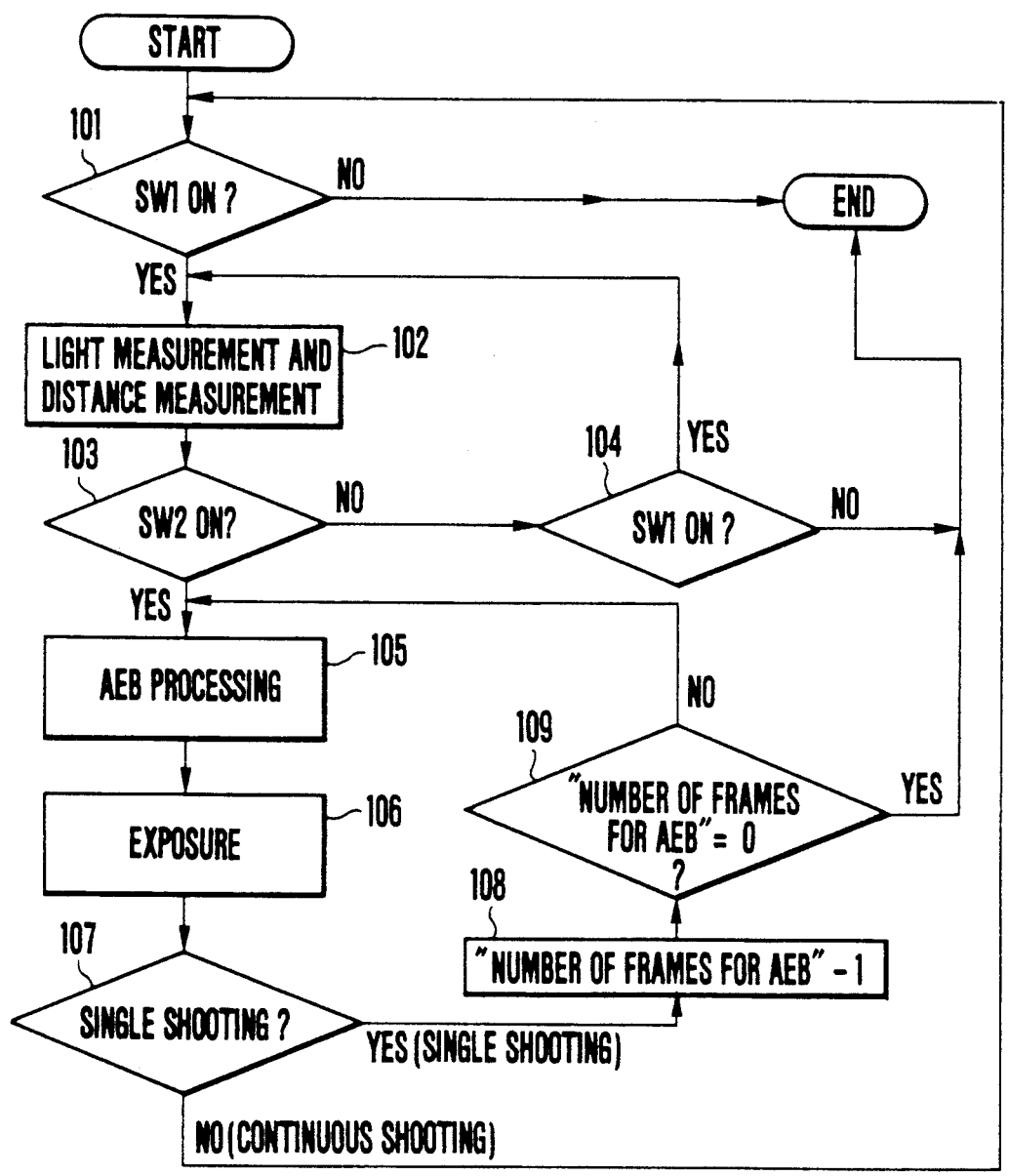
FIG. 1 is a flowchart showing an operation characteristic of a camera according to the present invention.
Figure 6:
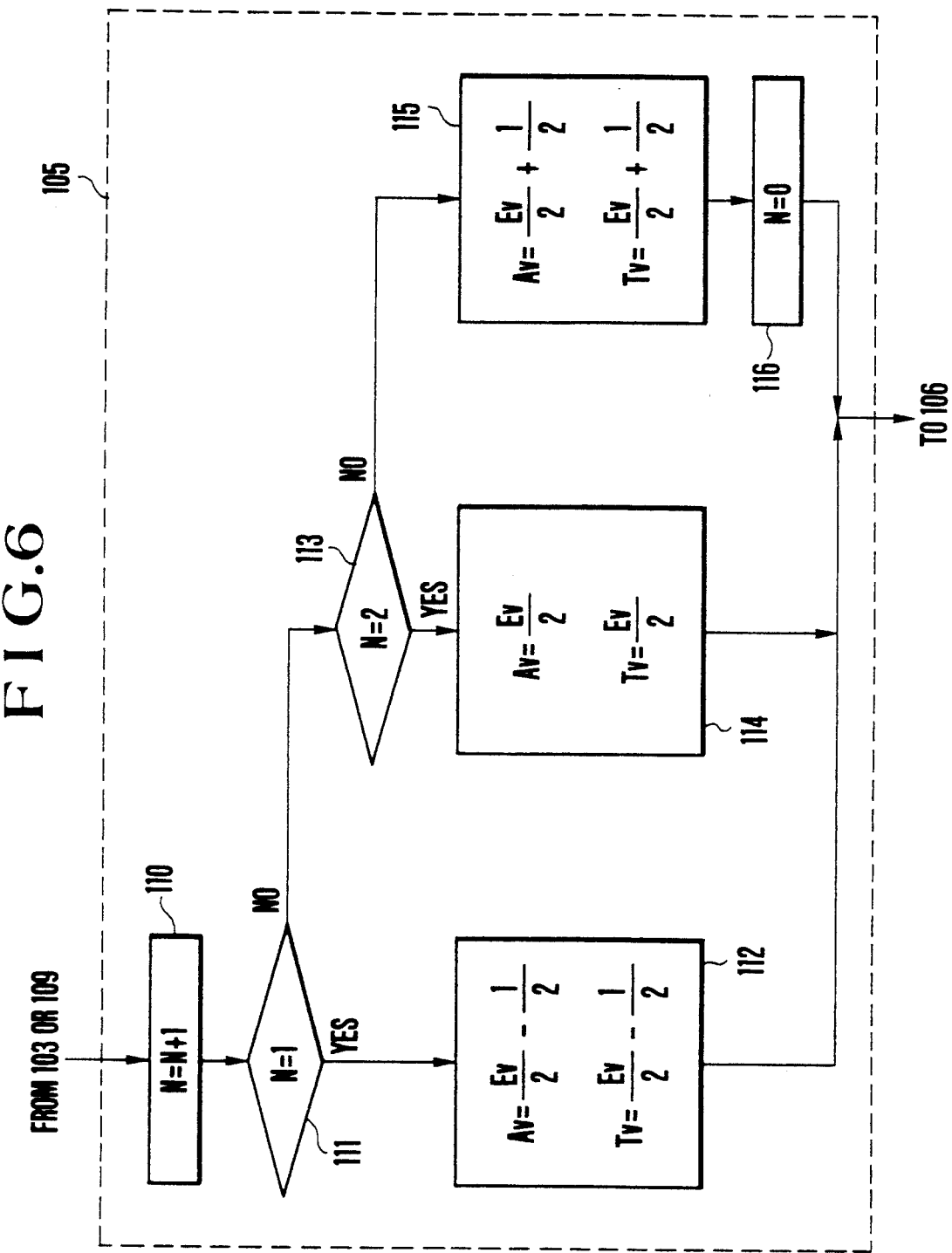
FIG. 6 is a flowchart showing the details of Step 105 of FIG. 1.

FIG. 6 is a flowchart showing the contents of Step 105 of FIG. 1. The AEB processing is described in detail below with reference to FIG. 6. It is assumed here that in the AEB processing of the flowchart, three exposures are made in different exposure compensation steps: "−1", "correct" and "+1".

Reference is first made to a case where the single shooting mode is selected and "3" is set as the number of frames for AEB.

When the switch SW2 is turned on and the AEB processing of Step 105 is initiated, the processing "N=N+1" is performed in Step 110, on the assumption that N is set to "0" at the start of this flow. Therefore, N=1 is obtained in Step 110. Step 112 is executed via Step 111. In Step 112, a shutter speed Tv and an aperture value Av are obtained on the basis of the light measurement value, Ev, obtained in Step 102.

In the computations performed in Step 112, the shutter speed Tv and the aperture value Av are each obtained by subtracting ½ from Ev/2, that is, the value which provides correct exposure.

Subsequently, in Step 106, exposure control is performed on the basis of Tv and Av obtained in Step 112, whereby the exposure of the first frame for AEB is completed. The process proceeds to Step 108 via Step 107, and in Step 108 the number of frames for AEB minus one is calculated. Since the number of frames for AEB is set to "3", "2" is obtained by calculating the number of frames for AEB minus one in the processing of Step 108. The process returns to Step 105 via Step 109.

Returning to Step 105, N is set to N=2 in Step 110, and the process proceeds to Step 114 via Steps 111 and 113. In Step 114, Av and Tv are each set to Ev/2 which provides correct exposure. Subsequently, as described above, exposure control based on Tv and Av obtained in Step 114 is performed and the second frame for AEB is exposed. The process proceeds to Step 108 via Step 107, and in Step 108 the number of frames for AEB minus one is calculated to obtain "1". The process returns to Step 105 via Step 109.

Returning to Step 105, N is set to N=3 in Step 110, and the process proceeds to Step 115 via Steps 111 and 113. In Step 115, Tv and Av are each obtained by adding ½ to Ev/2, that is, the value which provides correct exposure.

Subsequently, after N has been set to N=0 in Step 116, the process proceeds to Step 106, where exposure control is performed on the basis of Tv and Av obtained in Step 115, whereby the exposure of the third frame for AEB is completed. The process proceeds to Step 108 via Step 107, and in Step 108 the number of frames for AEB minus one is calculated to obtain "0". Thus, the process comes to an end via Step 109.

The following description is made as to a case where the continuous shooting mode is selected.

In this case, while the switch SW2 is on, Step 105 is continuously repeated. Thus, Steps 112, 114 and 115 are repeated for each photography until the switch SW2 is turned off.

FIG. 5 is a table showing how the AEB processing differs depending on whether the switch SW2 (release button) is on or off when the transport mode is set to the single shooting mode (the mode in which once the release button is depressed to perform a shutter release operation, the next shutter release operation is not permitted until the pressing of the release button is stopped) or when the transport mode is set to the continuous shooting mode (the mode in which a shutter release operation is repeated as long as the release button is depressed, and is not stopped until the pressing of the release button is stopped). In the AEB processing shown in FIG. 5, the number of frames for AEB in the single shooting mode is set to "4" so as to execute exposure control in four steps: "correct", "−1", "−2" and "−3".

As can be seen from Table of FIG. 5, when the transport mode is set to the continuous shooting mode, the shutter can be released by turning on the switch SW2, whereby photography in favor of shutter opportunity can be achieved. The AEB processing executed at this time is as shown in Table of FIG. 5. In a case where the transport mode is set to the single shooting mode, once a shutter release operation is initiated by turning on the switch SW2, even if the switch SW2 is again turned on, it is impossible to perform the next shutter release operation at a desired timing until exposures are made by the number of frames set for AEB. However, since AEB exposures for a set number of frames can be continuously made by once depressing the release button, it is possible to eliminate the awkward operation of successively depressing the release button during the AEB photography of a still subject.

Figure 7:
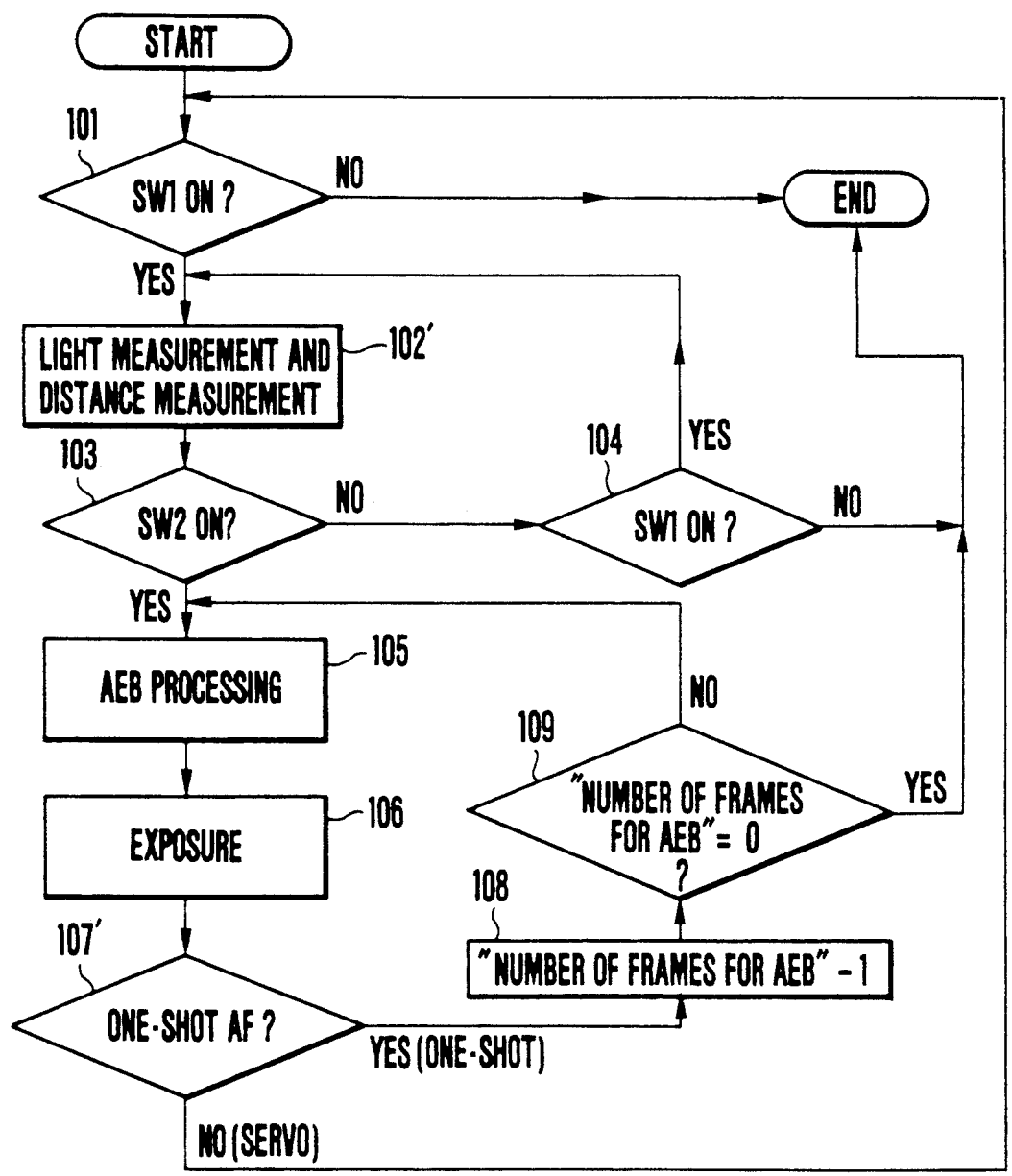
FIGS. 7 and 8 are flowcharts showing a control flow according to another embodiment of the present invention.

FIG. 7 is a flowchart showing another embodiment of the control flow for the camera according to the present invention.

In the flowchart of FIG. 7, identical reference numerals are used to denote steps which are identical to those shown in FIG. 1.

Referring to the flowchart of FIG. 7, if it is determined in Step 107' that a one-shot AF mode has been set in the camera, the process proceeds to Step 108. In the case of a servo AF mode, the process proceeds to Step 101. Accordingly, if the one-shot AF mode is selected, AEB processing is performed in a manner similar to that of the single shooting mode explained in connection with FIG. 1, so that AEB exposures for the number of frames set for AEB are continuously made by once depressing the shutter release button. If the servo AF mode is selected, AEB photography is performed in a manner similar to that of the continuous shooting mode.

Figure 8:
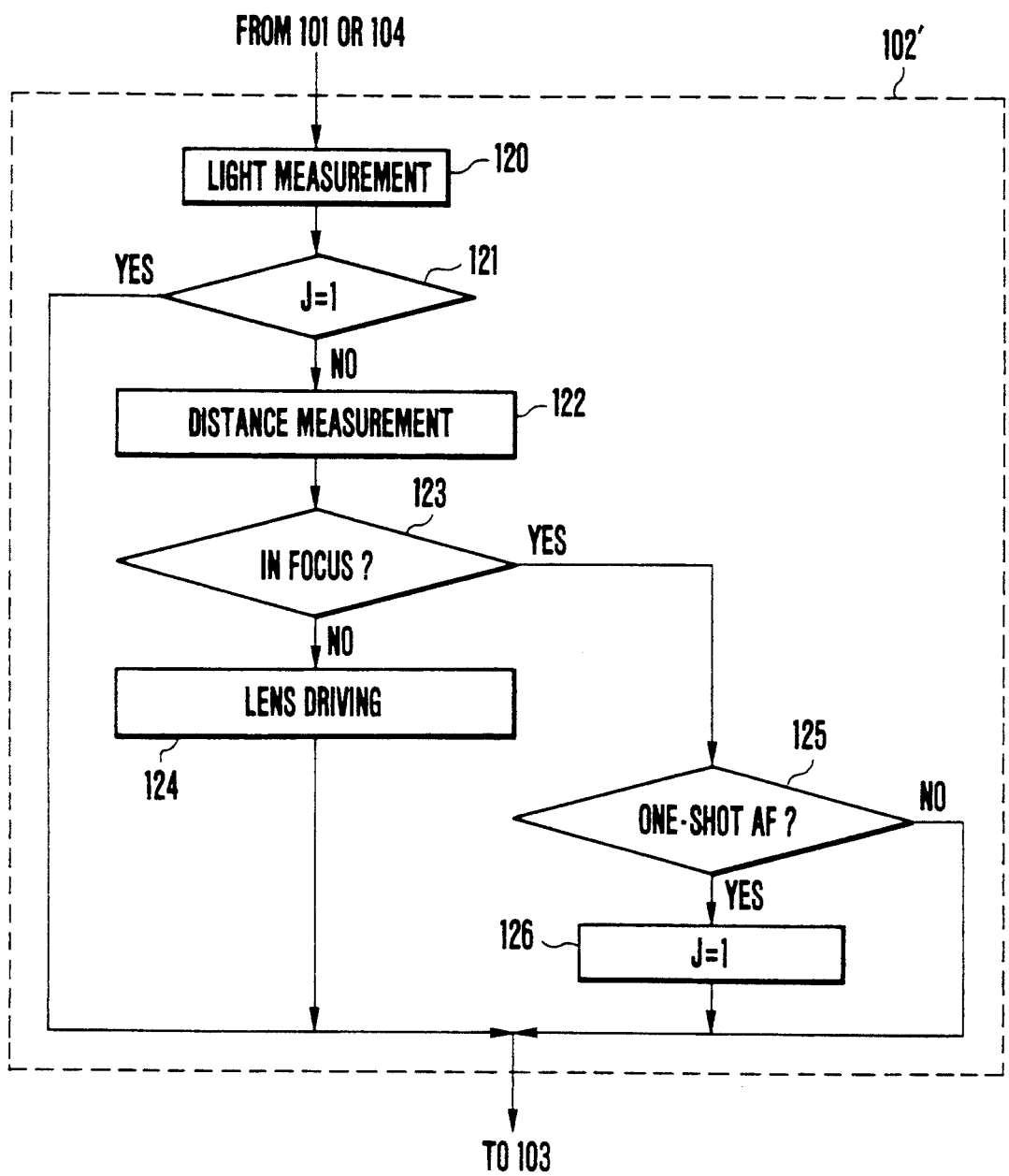

FIG. 8 is a flowchart showing the details of a light measurement operation and a distance measurement operation which are performed in Step 102' of FIG. 7.

In FIG. 8, light measurement is performed in Step 120, and in Step 121 it is determined that J has been set to "1". J is set to "0" at the time of start and, as described later, if in-focus is achieved in the one-shot AF mode, J is set to "1". Distance measurement is performed in Step 122, and in Step 123 whether in-focus has been achieved is determined on the basis of the measurement result. In Step 124, information on the amount of lens driving based on the measurement result is transmitted to the motor controlling circuit 2, so that the lens is driven to effect focusing. Accordingly, during an out-of-focus state, each time Step 102' is carried out, distance measurement is performed irrespective of whether the one-shot AF mode or the servo AF mode has been selected, and the lens is driven on the basis of the measurement result. If it is determined in Step 123 that in-focus has been achieved, the process proceeds to Step 125. In Step 125, it is determined whether the AF mode is the one-shot AF mode or the servo AF mode. The mode selection is set by a switch (not shown), and is set in the microcomputer 1 via the switch sensing circuit 4. If the servo AF mode is active, the process proceeds to Step 103. Accordingly, during the servo AF mode, each time Step 102' is executed, a distance measurement operation is repeated. If the one-shot AF mode is active, the process proceeds to Step 126, where J is set to J=1. In consequence, since J=1 is detected at the time of the next execution of Step 102' in Step 121, the subsequent focusing is inhibited.

As is apparent from the foregoing description, by executing control in accordance with the flows shown in FIGS. 7 and 8, it is possible to perform AEB photography for a plurality of frames by once depressing the shutter release button during the one-shot AF mode. During the servo AF mode, AEB photography is performed while and each time the release button is depressed.

What is claimed is:

1. A camera provided with an automatic exposure bracketing photography controlling circuit for performing photography while automatically altering an exposure value for exposure of each frame, comprising:
    a) a setting circuit for setting a photographic condition; and
    b) a selecting circuit for selectively determining a control state of said automatic exposure bracketing photography controlling circuit in accordance with the photographic condition set by said setting circuit, said automatic exposure bracketing photography controlling circuit having a first mode for performing continuous photography for a predetermined number of frames while altering an exposure value for each of the frames by a single operation of a release operation member and a second mode for continuously performing photography while alternating an exposure value for each frame as long as the release operation member is being operated, said selecting circuit selecting the first mode if the set photographic condition is a single shooting mode in which photography of each frame is performed each time the release operation member is operated and the second mode if the set photographic condition is a continuous shooting mode in which photography is continuously performed while the release operation member is being operated.

2. A camera provided with an autofocus device having a one-shot autofocus mode and a servo autofocus mode, and an automatic exposure bracketing photography controlling circuit for performing photography while automatically altering an exposure value for exposure of each frame, comprising:
    a) a setting circuit for setting a photographic condition; and
    b) a selecting circuit for selectively determining a control state of said automatic exposure bracketing photography controlling circuit in accordance with the photographic condition set by said setting circuit, said automatic exposure bracketing photography controlling circuit having a first mode for performing continuous photography for a predetermined number of frames by a single operation of a release operation member and a second mode for continuously performing photography while altering an exposure value for each frame as long as the release operation member is being operated, said selecting circuit selecting the first mode if the set photographic condition is a one-shot autofocus mode utilizing the autofocus device and the second mode if the set photographic condition is a servo autofocus mode utilizing the autofocus device.

3. A camera having a single shooting mode for performing photography each time a release operation member is operated and a continuous shooting mode for continuously performing photography while the release operation member is being operated, comprising:
   a) an automatic exposure bracketing photography controlling circuit having a first mode for performing continuous photography for a plurality of frames while altering an exposure value for each frame by a single operation of the release operation member and a second mode for continuously performing photography while altering an exposure value for each frame as long as the release operation member is being operated; and
   b) a selecting circuit for selecting the first mode when photography is performed in the single shooting mode and the second mode when the photography is performed in the continuous shooting mode.

4. A camera according to claim 3, further comprising a light measurement circuit, said automatic exposure bracketing photography controlling circuit, when in the first mode, determining the exposure value for exposure of each of the frames with respect to the exposure value based on an output of said light measurement circuit before photography for the initial one of said frames.

5. A camera according to claim 3, further comprising a light measurement circuit, said automatic exposure bracketing photography controlling circuit, when in the second mode, determining the exposure value for exposure of each frame on the basis of an output of said light measurement circuit before photography for that frame.

6. A camera according to claim 4, wherein said automatic exposure bracketing photography controlling circuit, when in the second mode, determining the exposure value for exposure of each frame on the basis of an output of said light measurement circuit before photography for that frame.

7. A camera having an autofocus device having a one-shot autofocus mode in which an autofocus operation is inhibited once in-focus is achieved and a servo autofocus mode in which the autofocus operation is repeatedly performed even if in-focus is achieved before photography, comprising:
   a) an automatic exposure bracketing photography controlling circuit having a first mode for performing continuous photography for a plurality of frames while altering an exposure value for each of the frames by a single operation of a release operation member and a second mode for continuously performing photography while altering an exposure value for each frame as long as the release operation member is being operated; and
   b) a selecting circuit for selecting the first mode when the autofocus device is in the one-shot autofocus mode and the second mode when the autofocus device is in the servo autofocus mode.

8. A camera according to claim 7, wherein, in the one-shot autofocus mode, said autofocus device performs focusing before photography for an initial frame and inhibits focusing before photography for each of the subsequent frames.

9. A camera according to claim 7, wherein, in the servo autofocus mode, said autofocus device performs focusing before photography for each of the frames.

10. A camera according to claim 8, wherein, in the servo autofocus mode, said autofocus device performs focusing before photography for each of the frames.

11. A camera according to claim 9, wherein, in the servo autofocus mode, said autofocus device performs one focusing operation before photography for each of the frames after the photography for an initial frame.

12. A camera according to claim 7, further comprising a light measurement circuit, said automatic exposure bracketing photography controlling circuit, when in the first mode, determining the exposure value for exposure of each of the frames with respect to the exposure value based on an output of said light measurement circuit before photography for the initial one of said frames.

13. A camera according to claim 7, further comprising a light measurement circuit, said automatic exposure bracketing photography controlling circuit, when in the second mode, determining the exposure value for exposure of each frame on the basis of an output of said light measurement circuit before photography for that frame.

14. A camera according to claim 12, wherein said automatic exposure bracketing photography controlling circuit, wherein in the second mode, determining the exposure value for exposure of each frame on the basis of an output of said light measurement circuit before photography for that frame.

15. A camera provided with an automatic exposure bracketing photography controlling circuit for performing photography while automatically altering an exposure value for exposure of each frame, comprising:
   a) said automatic exposure bracketing photography controlling circuit having a first mode for performing continuous photography for a plurality of frames while altering an exposure value for each of said frames by a single operation of a release operation member and a second mode for continuously performing photography while altering an exposure value for each frame as long as the release operation member is being operated; and
   b) a selecting circuit for selecting the first mode if the set photographic condition is a single shooting mode in which photography of each frame is performed each time the release operation member is operated and the second mode if the set photographic condition is a continuous shooting mode in which photography is continuously performed while the release operation member is being operated.

16. A camera having a single shooting mode for performing photography each time a release operation member is operated and a continuous shooting mode for continuously performing photography while the release operation member is being operated, comprising:
   a) an automatic exposure bracketing circuit for performing photography while altering an exposure value; and
   b) a control circuit for causing a control state of said automatic exposure bracketing circuit when the single shooting mode is selected to differ from a control state of said automatic exposure bracketing circuit when the continuous shooting mode is selected.

17. A camera according to claim 16, wherein said control control restricts the number of frames to be controlled for exposure by the automatic exposure bracketing circuit to a predetermined plural number when the automatic exposure bracketing circuit is in the single shooting mode and wherein said control circuit does not restrict the number of frames to be controlled for exposure by the automatic exposure bracketing circuit to a predetermined plural number when the automatic exposure bracketing circuit is in the continuous shooting mode.

18. A camera having an autofocus device having a one-shot autofocus mode in which an autofocus operation is inhibited once in-focus is achieved and a servo autofocus mode in which the autofocus operation is repeatedly performed even when if in-focus is achieved before photography; comprising:
 a) an automatic exposure bracketing circuit for performing photography while altering an exposure value; and
 b) a control circuit for causing a control state of said automatic exposure bracketing circuit when said autofocus device is in the one-shot autofocus mode to differ from a control state of said automatic exposure bracketing circuit when said autofocus device is in the servo autofocus mode.

* * * * *

UNITED STATES PATENT AND TRADEMARK OFFICE
CERTIFICATE OF CORRECTION

PATENT NO. : 5,333,027
DATED : July 26, 1994
INVENTOR(S) : Hiroshi Matsushima

It is certified that error appears in the above-indentified patent and that said Letters Patent is hereby corrected as shown below:

Insert --Item --[30] Foreign Application Priority Data
June 6, 1990 [JP] JAPAN ..... HEI02-148037
June 6, 1990 [JP] JAPAN ..... HEI02-148038

Col. 2, lines 2, 4, "change "frees" to --frames--

Col. 2, line 8, change "and" to --or--

Col. 2, line 36, change "the-second" to --the second--

Col. 3, line 62, delete "," after "circuit" (first occurrence)

Col. 5, line 61, change "frees" to --frames--

Col, 10, line 26, change "wherein" to --when--

Col. 10, line 67, change "control" second occurrence to --circuit--

Col. 12, line 1, delete "when"

Signed and Sealed this

Twenty-fifth Day of October, 1994

Attest:

BRUCE LEHMAN

Attesting Officer

Commissioner of Patents and Trademarks